United States Patent [19]
Meli

[11] Patent Number: 6,039,361
[45] Date of Patent: Mar. 21, 2000

[54] PLUMBING COMPRESSION FITTING FOR CONNECTING ENDS OF PIPE

[75] Inventor: Oswald P. J. Meli, Solihull, United Kingdom

[73] Assignee: MWM Distributors, West Midlands, United Kingdom

[21] Appl. No.: 09/010,052

[22] Filed: Jan. 21, 1998

[51] Int. Cl.[7] .................................................. F16L 55/00
[52] U.S. Cl. ................. 285/148.19; 285/322; 285/334.4; 285/334.5; 285/342; 285/328
[58] Field of Search .............................. 285/334.5, 322, 285/323, 148.19, 334.4, 341, 342, 343, 328

[56] References Cited

U.S. PATENT DOCUMENTS

| | | | |
|---|---|---|---|
| 2,165,626 | 7/1939 | Ford | 285/334.5 X |
| 2,320,812 | 6/1943 | Cowles | 285/334.5 |
| 5,213,375 | 5/1993 | Wu | 285/322 X |

FOREIGN PATENT DOCUMENTS

| | | | |
|---|---|---|---|
| 2657144 | 7/1992 | France | 285/322 |
| 1944782 | 6/1970 | Germany | 285/323 |
| 837020 | 6/1960 | United Kingdom | 285/323 |

*Primary Examiner*—Dave W. Arola
*Attorney, Agent, or Firm*—Greer, Burns & Crain, Ltd.

[57] ABSTRACT

A plumbing compression fitting for use in coupling a first pipe end of a first pipe to an opposing end of a second pipe includes a coupling housing defining a flow passage therethrough, and having a first pipe securing end for engaging the first end of the first pipe, and a second pipe securing end for engaging the end of the second pipe, the flow passage dimensioned to accommodate the ends of the pipes and having a first cross-sectional area. A capture nut has an axial opening in communication with the passageway and is dimensioned to accommodate the first pipe, the capture nut defining an annular seat and being configured to threadably engage the first pipe securing end of the coupling housing. A grab ring has a circumference and is dimensioned be received in the capture nut, an inner grab surface is dimensioned to circumscribe the first pipe and an outer surface configured to engage the seat. The grab ring defines a gap in the circumference which narrows as the capture nut is tightened upon the first pipe securing end to compressively retain the first pipe in the housing.

8 Claims, 2 Drawing Sheets

PLUMBING COMPRESSION FITTING FOR CONNECTING ENDS OF PIPE

BACKGROUND OF THE INVENTION

The present invention relates to plumbing fittings which join together opposed ends of broken or otherwise dissimilar pipe segments using compressive forces, and more specifically to a plumbing compression fitting which is used by municipalities and commercial plumbing contractors for coupling free ends of water supply pipes.

Compression fittings of the sort contemplated by the present invention are typically used when connecting the water line of a new construction, i.e., a new or remodeled residence or commercial building, with pipes from an existing water system. In many cases, the new construction employs copper pipe, while the pipes of the existing water system are galvanized steel, cast iron or even lead, depending on the age of the system. Since ends of the copper pipe are too soft to support threads, the common method of attachment is to solder together the ends of adjacent copper pipe segments using socket type fittings. However, segments of non copper (galvanized, iron or lead) pipe are typically threaded together using various couplings, nipples, tees, etc. as are well known in the art. A problem arises when repairs are required in existing water systems using non copper pipe, or in construction situations where a copper line has to be connected to an existing non copper pipe system. In some cases, the existing non copper system has ruptured and there are free ends of pipe to be joined using segments of replacement pipe.

Compression fittings are known for use in coupling copper pipe to non copper pipe. Such fittings typically include a main housing which is constructed along the axis of the two pipe ends to be joined. After threading a capture nut and a compression ring over the end of each pipe to be coupled, each pipe end is inserted into an opposite end of the main housing. Regarding the non copper pipe end, which is typically cut to have a straight end, the capture nut receives the compression ring and is then threaded onto the end of the main fitting housing. As the capture nut tightens upon the housing, the compression fitting is compressed and simultaneously seats upon the end of the fitting, and is compressed to form a tight interference fit between the capture nut and the pipe. In some applications, the capture nut is castellated, and employs a set screw or locking pin to hold the nut in place.

On the copper pipe side of the fitting, the end of the copper pipe is typically flared after threading a capture nut thereon. The capture nut has a corresponding flared contour, and as the nut is tightened upon the opposite end of the housing, the flared pipe end is pressed into abutting relationship against a radiused or contoured end of the fitting which corresponds to the flare of the pipe. Further tightening of the capture nut creates a tight seal of the flared pipe end against the housing, usually without the use of a separate compression ring.

These types of fittings are conventionally available in embodiments designed for household use and/or for contractor use in coupling the water systems of buildings to main water feed lines, and for repairing large sections of existing water systems. However, the present invention is primarily concerned with compression fittings of the type used by contractors. One problem with conventional compression fittings of this type, is that on the non copper pipe end of the main compression fitting housing, a plastic or polymeric compression ring is used. A drawback of this type of component is that upon extreme tightening to obtain a water tight seal, the plastic compression ring can be deformed to the extent that it is partially forced out the back of the capture nut. Even when such assemblies obtain a water tight seal, the coupling cannot be reused if subsequent repairs to that section of pipe are needed. Similar disadvantages have been observed with compression rings made of metal.

Another drawback of conventional compression couplings is that when the existing pipe is made of lead, in the course of repairing and reinstalling the water line in the ground, the pipe often is subject to an axial pulling force which causes the pipe to be pulled out of the coupling. The pulling force may be due either to contractor's activities or to natural ground movements. Since this reopens the leak just repaired, it is obviously a situation to be avoided. A related drawback concerns the constitution of the lead pipe. It has been found that upon over tightening of conventional compression fittings at repair junctions of lead pipe, the lead pipe has been known to compress to the point that the inner diameter of the pipe narrows or "necks down". This situation may cause unwanted pressure variations and resulting stresses on the water system.

Still another disadvantage of conventional copper/non copper pipe compression fitting connections is that in some cases, the copper and lead pipe come in contact with each other, which causes galvanic corrosion and further weakens aging water systems.

Yet another drawback of conventional compression fittings is that when the castellated capture nuts and set screws are employed, in some cases the contractor does not adequately tighten the set screw, or completely forgets to tighten it at all. Eventually the nut works lose and the coupling begins to leak.

Thus, there is a need for a plumbing compression fitting which can couple copper to non copper pipes in a way that water tight seals are achieved. There is also a need for such a fitting which can be reopened upon the need for subsequent repair, and which allows the reuse of the compression fitting components. Further, there is a need for an improved fitting which does not cause lead pipe to neck down upon tightening.

Accordingly, a first object of the present invention is to provide an improved compression fitting which maintains a water tight coupling upon axial pulling force exerted on the coupled pipe.

Another object of the present invention is to provide an improved compression fitting in which the compression member does not deform under tightening and is reusable.

A further object of the present invention is to provide an improved compression fitting which does not cause necking down of lead pipe upon tightening.

BRIEF SUMMARY OF THE INVENTION

The above-listed objects are met or exceeded by the present plumbing compression fitting. Included in the features of the present fitting is a specially configured grab ring which promotes sealing as the capture nut is threaded upon the main compression fitting housing, and which also has a gap in its circumference for permitting its removal if the need arises for subsequent repair of the coupling joint. Among other things, the structural interaction between the grab ring and the adjacent surface on the capture nut creates a coupling whereby upon any pulling of the coupled pipe in an axial direction away from the fitting, the grab ring will even more securely retain the pipe end. Another feature is the sealing O-ring which is disposed between the grab ring and the corresponding end of the fitting housing. The O-ring fits around the pipe end which is engaged by the grab ring and assists in sealing the coupling.

More specifically, the present invention provides a plumbing compression fitting for use in coupling a first pipe end of a first pipe to an opposing end of a second pipe, the fitting including a coupling housing defining a flow passage therethrough, and having a first pipe securing end for engaging the first end of the first pipe, and second pipe securing end for engaging the end of the second pipe, the flow passage dimensioned to accommodate the ends of the pipes and having a first cross-sectional area. A capture nut has an axial opening in communication with the passageway and is dimensioned to accommodate the first pipe, the capture nut defining an annular seat and being configured to threadably engage the first pipe securing end of the coupling housing. A grab ring has a circumference and is dimensioned to be received in the capture nut, an inner grab surface is dimensioned to circumscribe the first pipe and an outer surface configured to engage the seat. The grab ring defines a gap in the circumference which narrows as the capture nut is tightened upon the first pipe securing end to compressively retain the first pipe in the housing.

In the preferred embodiment, with the exception of the O-ring, all of the components are made of metal, to better resist the problem of deformation of the compression member, which has been known in prior art fittings to creep rearwardly out of the capture nut upon tightening. Also, the main fitting housing features a pipe stop to better retain the pipe ends in place.

DETAILED DESCRIPTION OF THE INVENTION

Figure 1:
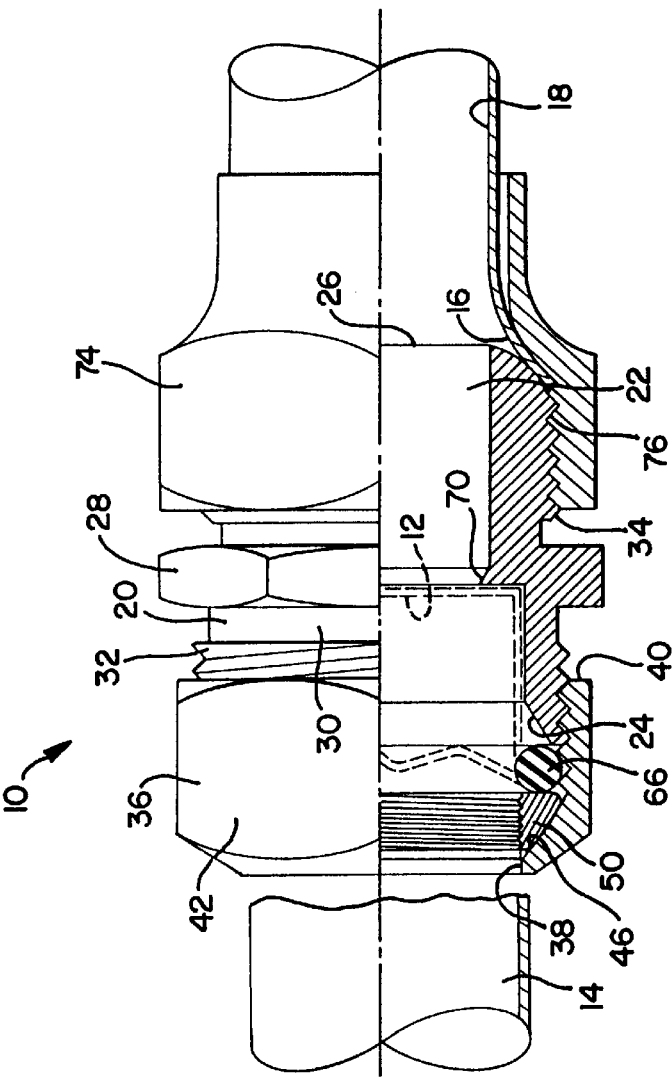
FIG. 1 is a side elevational view, in partial section, of the present compression fitting shown connecting ends of two different pipes.
Figure 3:
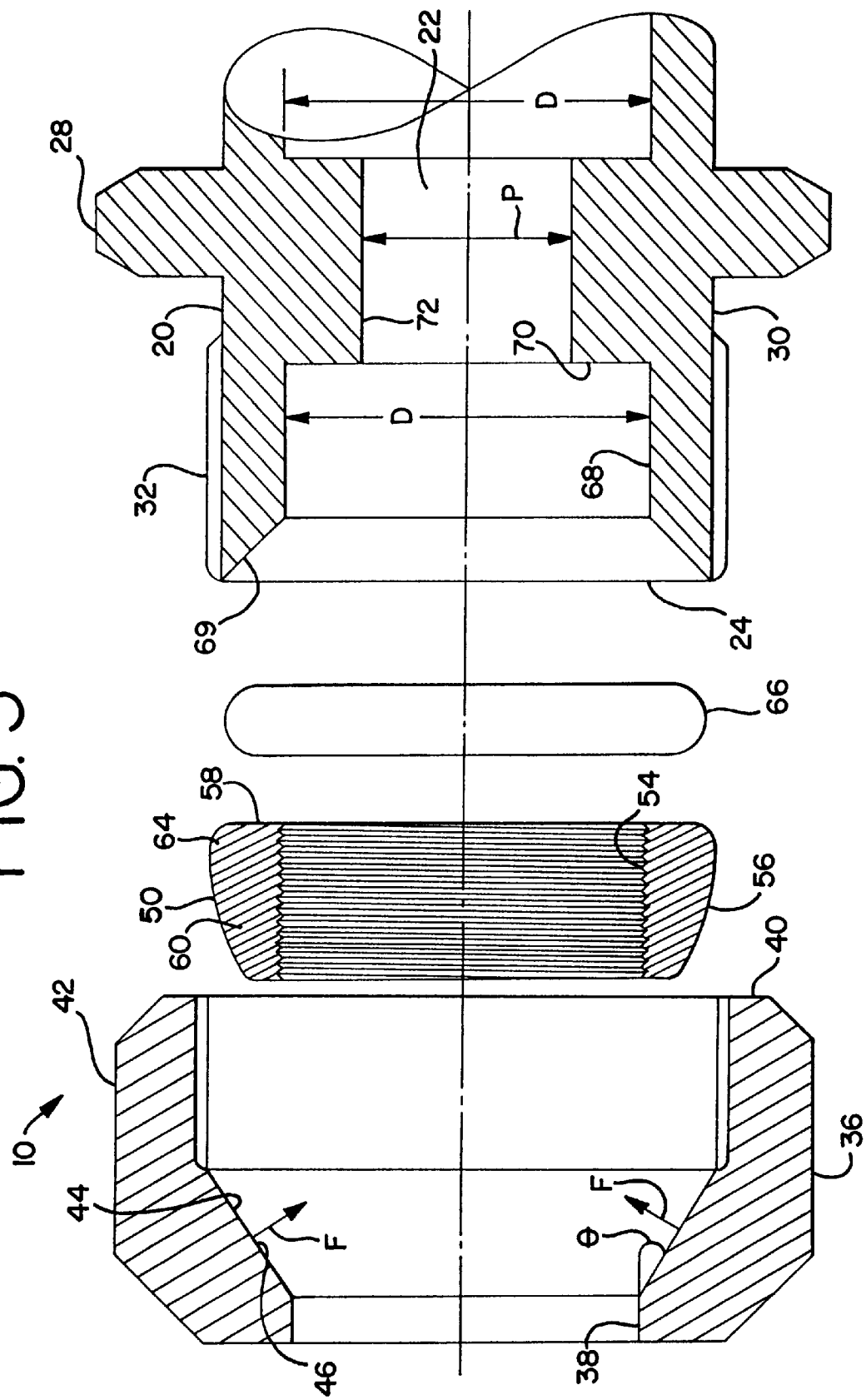
FIG. 3 is an exploded side elevational view, in partial section, of the present compression fitting, with portions deleted for clarity.

Referring to FIGS. 1 and 3, the plumbing compression fitting of the invention is generally designated 10 and is designed for use in coupling a first pipe end 12 (shown in phantom) of a first pipe 14 to an opposing end 16 of a second pipe 18. In the preferred embodiment, the first pipe 14 is made of a non copper metal (lead, galvanized or cast iron), and the second pipe 18 is made of copper. However, it is contemplated that pipes made of other materials may be substituted for the materials listed above, depending on the particular application.

Included in the fitting 10 is a coupling housing 20 defining a generally axially directed flow passage 22, a first pipe securing end 24 for engaging the first end 12 of the first pipe 14, and a second pipe securing end 26 for engaging the end of the second pipe. The housing 20 is preferably manufactured out of a durable metal alloy such as CZ132 gun metal or ounce metal, CZ121 leaded brass or other equivalent alloys known to skilled practitioners. Between the ends, 24, 26 is a radially projecting hex-shaped flange 28 which is configured for engagement with a wrench for use in holding the housing securely while the respective pipe ends 12, 16 are inserted. On an exterior surface 30 of the housing 20 are found a set of first threads 32 at the first pipe securing end 24, and a set of second threads 34 at the second pipe securing end 26.

The flow passage 22 is preferably dimensioned to accommodate the ends 12, 16 of the pipes 14, 18 and has a first cross-sectional area represented by the diameter "D" (best seen in FIG. 3). It is contemplated that the diameter D will vary as housings 20 are built for various plumbing environments and are dimensioned to receive pipe of differing outside diameters. However, the size of any particular pipe securing end 24, 26 will be fixed upon manufacture to receive only a specified diameter of pipe. It is also contemplated that the diameter D at the first pipe securing end 24 may in some cases be different from the diameter D at the second pipe securing end 26 for those applications where different diameters of pipe are being coupled together.

A capture nut 36 has an axial opening 38 and is configured with an interior threaded end 40 for threadably engaging the threads 32 of the first pipe securing end 24. The axial opening 38 is in communication with the passageway 22 and is dimensioned to slidingly accommodate the first pipe 14. A faceted exterior 42, preferably hex-shaped, is provided for engagement with a wrench. It is contemplated, however that the number and shapes of the facets are subject to design changes based on particular applications.

On an interior surface 44 of the capture nut 36, an annular seat 46 is defined, and is located between the axial opening 38 and the threaded end 40. In the preferred embodiment, the seat 46 is disposed at an approximate 45° angle θ to the rotational axis of the capture nut, which, upon assembly of the fitting 10, is also the longitudinal axis of the housing 20. It is contemplated that the angle of orientation θ of the seat 46 may vary with the application, as will be described below.

Figure 2:
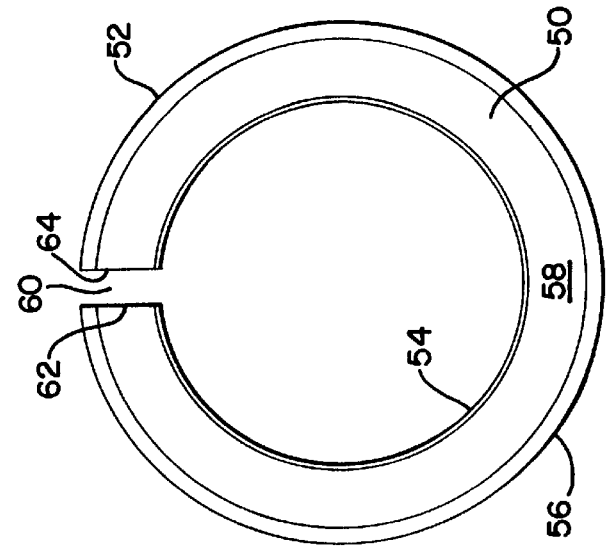
FIG. 2 is a front elevational view of the grab ring of the present compression fitting.

Referring now to FIGS. 1–3, the fitting 10 also includes a grab ring 50 which is dimensioned to be received within the capture nut 36, and as such is provided with a circumference or perimeter 52, as well as an inner grab surface 54 dimensioned to circumscribe the first pipe 14, an outer surface 56 configured to engage the seat 46, and a front surface 58 configured for facing the first pipe securing end 24. It will be understood that as the diameter D varies with the diameter of the pipe to be coupled, so will the perimeter 52 of the grab ring 50. Also included on the grab ring 50 is a gap 60 defined by opposed ends 62, 64 of the ring.

In the preferred embodiment, the inner grab surface 54 is provided with a threaded or ribbed texture which facilitates the grasping of the exterior of the first pipe 14. It is contemplated however, that the grab surface may be provided with other checkering or textural structure for enhancing the frictional engagement between the ring 50 and the pipe 14. The grab ring 50 is configured so that the threads on the surface 54 compress or "bite" slightly into the pipe for a strong connection. It has been found that when using this structure, upon the first pipe 14 being axially pulled away from the housing 20, the fitting 10 grasps the pipe even more securely.

An important feature of the present fitting 10 is the gap 60, which gradually narrows as the capture nut 36 is threaded ever tighter upon the threads 32 of the first pipe securing end of the housing 20. This action helps to compressively retain the first pipe 14 in the housing 20, but also prevents malformation of the ring 50, which allows it to be removed from the fitting and reused should the coupling connection made by the fitting 10 need to be reopened. Further, the gap 60 allows the grab ring 50 to be manufactured with a certain degree of radial outwardly directed biasing force or preload, which facilitates the seal between the ring and the capture nut 36, yet also permits the removal of the ring so that it may be used again when the pipes are recoupled.

Another important feature of the present fitting 10 is that the outer surface 56 of the grab ring is radiused, and the radius is disposed so that the outer surface 56 defines a gradual incline or cam configuration as one progresses toward the front surface 58 (best seen in FIG. 3). It has been found that the angled seat 46 cooperates with the outer surface 56 in creating a better connection between the first pipe 14 and the housing 20. More specifically, as the capture nut 36 is tightened upon the first pipe securing end 24 of the housing 20, the seat 46 exerts a force designated by the arrows "F" upon the radiused surface 56 of the grab ring, the force being generally perpendicular to the seat. When the seat is configured so that this force is properly directed, the grab ring 50 will push down on the exterior of the pipe 14, and the gap 60 will narrow so that the ring is simultaneously squeezed against the pipe and also forced toward the pipe securing end 24.

If the seat angle is too shallow (the angle is closer to being parallel with the side of the aperture 38), the ring 50 will have a tendency to be forced out the aperture 38 and deformed. If the seat angle is too steep (the angle approaches the perpendicular to the longitudinal axis of the housing 20), it will tend to push the ring 50 forward rather than downward against the exterior of the pipe 14. The threads or texture on the inner surface 54 become slightly embedded or bite into the exterior of the first pipe end 12 of the first pipe 14 to form a secure connection between the pipe and the fitting 10, and to prevent the pipe from being unintentionally released from the fitting.

Referring now to FIGS. 1 and 3, another component of the present fitting 10 is an O-ring 66 dimensioned to circumscribe the pipe 14 and to fit between the first pipe securing end 24 of the housing 20 and the front surface 58 of the grab ring 50 to provide a water tight seal between the pipe and the housing. As the capture nut 36 tightens upon the threads 32, the grab ring 50 compresses the O-ring 66 against the first pipe securing end 24. This action enhances the sealed connection between the pipe end 12 and the fitting housing 20.

To help secure the pipe 14 in the housing 20, and also to prevent the physical contact of lead and copper pipe segments, which causes electrolytic corrosion, the housing 20 includes a cylindrical inner pipe-receiving surface 68 defined at the first pipe securing end 24. The surface 68 is dimensioned to circumscribe the end of the first pipe, and also has a bevel 69 at the end 24 for receiving the O-ring 66. In addition, a pipe stop 70 defines an end of the surface 68 and protrudes radially inwardly from the surface 68. An aperture 72 is defined by the pipe stop 70, and has a second cross-sectional area "P" dimensioned smaller than the first cross-sectional area "D" of the flow passage 22. Thus, the pipe stop 70 prevents the end 12 of the first pipe 14 from sliding completely through the housing 20. It will be appreciated that the radial dimension and also the axial length of the pipe stop 70 may change with the application, and in FIGS. 1 and 3 the length of the stop 70 is shown as respectively short and long.

Referring now to FIG. 1, the second pipe end 16 of the second pipe 18 is depicted as a flared copper pipe end of the type well known to skilled practitioners. A flare capture nut 74 is shown capturing the flared pipe end 16 and retaining it against the second pipe securing end 26 of the housing 20. The nut 74 is preferably threaded over the second pipe 18 prior to the formation of the flare end. As is the first pipe securing end, the second pipe securing end 26 is provided with the threads 34 for engaging threads 76 of the flared capture nut. It will be seen that the second pipe securing end 26 is provided with a blunt ended configuration which helps define a standard AWWA (American Water Works Association) flare, complying with standard C800-89, shown on the second pipe securing end 26 for engaging flared copper pipe. Also, it will be appreciated that other types of connections for copper pipe, or even for non copper pipe, may be substituted for the preferred configuration of the second pipe securing end 26 depending on the types of pipe to be coupled.

Thus, it will be seen that the present plumbing compression fitting 10 provides a grab ring 50 that is both reusable and, once engaged by the capture nut 36, is capable of exerting a force upon the pipe end which will retain the pipe end in the fitting without deforming the grab ring. This feature is made possible by the cooperative geometry of the grab ring outside surface 56 and the annular seat 46. In addition, the present embodiment provides an O-ring 66 for added sealability of the pipe 14 within the housing 20. Accordingly, pipe connections made using the present fitting 10 are more secure and more resistant against axially directed pulling forces away from the fitting 10.

While a particular embodiment of the plumbing compression fitting for connecting ends of pipe of the invention has been shown and described, it will be appreciated by those skilled in the art that changes and modifications may be made thereto without departing from the invention in its broader aspects and as set forth in the following claims.

I claim:

1. A plumbing compression fitting for use in coupling a first pipe end of a first pipe to an opposing end of a second pipe, comprising:

a coupling housing defining a flow passage therethrough, and having a first pipe securing end for engaging the first end of the first pipe, and a second pipe securing end for engaging the end of the second pipe, said flow passage dimensioned to accommodate the ends of the pipes and having a first cross-sectional area;

a capture nut having an axial opening in communication with said passageway and dimensioned to accommodate the first pipe, said capture nut defining an angled annular seat and being configured to threadably engage said first pipe securing end of said coupling housing;

a grab ring dimensioned to be received in said capture nut, said grab ring having a circumference, an inner grab surface dimensioned to circumscribe the first pipe, an inclined radiused outer surface disposed to engage said angled seat, and a front surface, said grab ring defining a gap in said circumference which narrows as said capture nut is tightened upon said first pipe securing end to compressively retain the first pipe in said housing;

an O-ring dimensioned to fit between said first pipe securing end of said coupling housing and said front surface of said grab ring to provide a water tight seal between the pipe and said coupling housing;

said inclined radiused outer surface of said grab ring defining a camming surface which, when engaged by said angled seat, is subject to a force generally perpendicular to said seat, so that as said capture nut is tightened upon said first pipe securing end, said grab ring will be totally retained within said capture nut and will simultaneously move toward to engage compress said O-ring against said first pipe securing end and also tighten about the first pipe such that said grab ring remains free of engagement with said first pipe securing end.

2. The fitting as defined in claim 1 wherein said first pipe securing end of said coupling housing further comprises:

a cylindrical inner pipe-receiving surface dimensioned to circumscribe the end of the first pipe;

a pipe stop protruding radially inwardly from said cylindrical inner pipe-receiving surface, said pipe stop means defining an aperture, said aperture having a second cross-sectional area dimensioned smaller than said first cross-sectional area of said flow passage, whereby said pipe stop means prevents the end of the first pipe from sliding completely through said coupling housing.

3. The fitting as defined in claim 1 wherein said inner surface of said grab ring is provided with threads for gripping an outside surface of the first pipe as said capture nut is tightened upon said housing.

4. The fitting as defined in claim 3 wherein said grab ring is configured so that said threads compress slightly into the pipe so that upon the first pipe being axially pulled away from said housing, said fitting is tightened upon the pipe.

5. The fitting as defined in claim 1 wherein said coupling housing further comprises a standard AWWA flare on said second end for engaging flared copper pipe.

6. The fitting as defined in claim 1 wherein said grab ring is configured so that said gap is reopenable upon disengagement of said capture nut from said housing so that said grab ring is reusable.

7. The fitting as defined in claim 1 wherein said annular seat is disposed at an angle of approximately 45° to a rotational axis of said capture nut.

8. The fitting as defined in claim 1 wherein said front surface of said grab ring has a bevel for receiving said O-ring.

\* \* \* \* \*